Patented July 5, 1927.

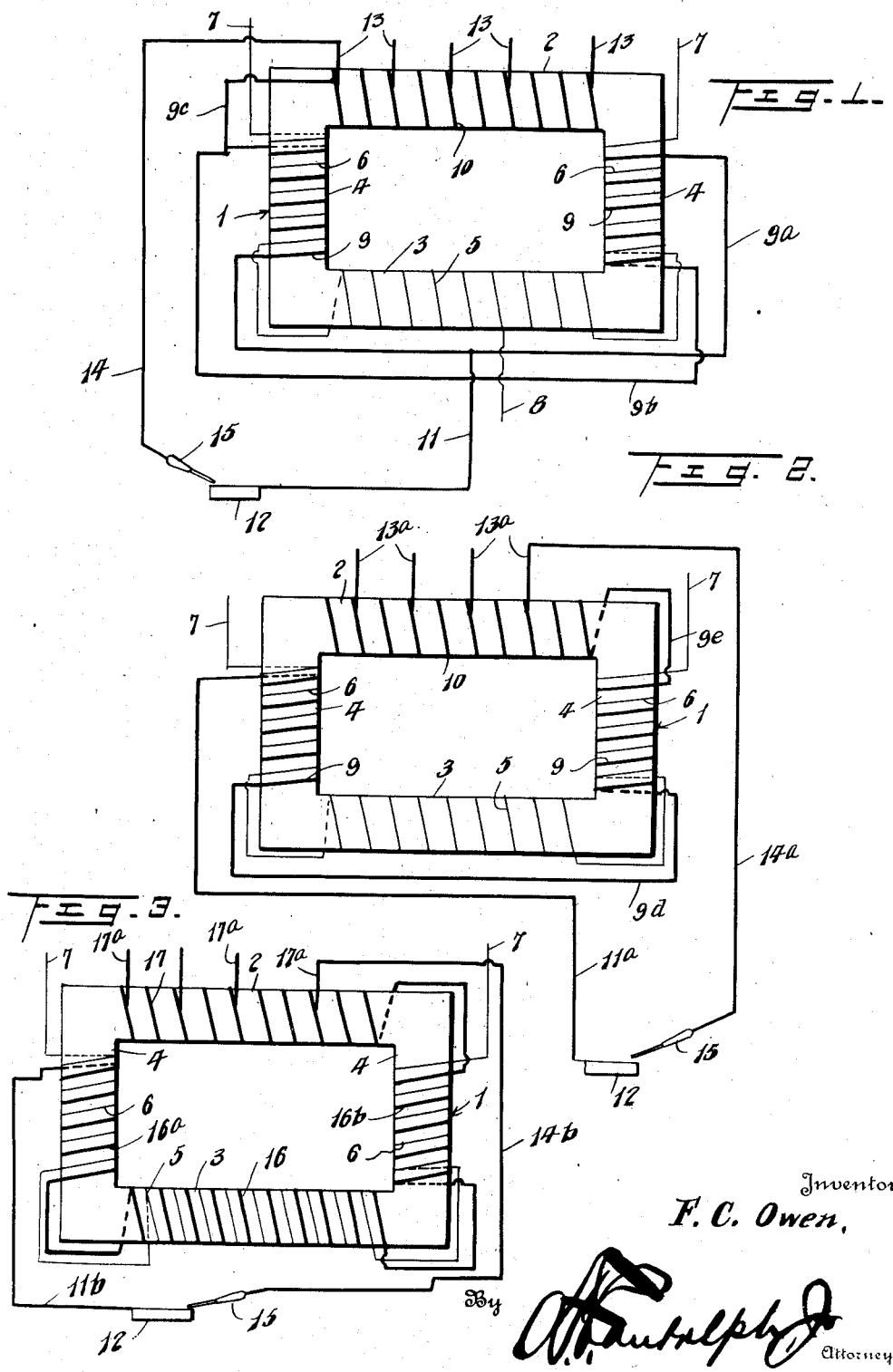

1,634,959

UNITED STATES PATENT OFFICE.

FREDERICK C. OWEN, OF FAYETTEVILLE, NORTH CAROLINA.

TRANSFORMER FOR ELECTRIC-ARC CUTTING, REPAIRING, AND WELDING APPARATUS.

Application filed November 19, 1925. Serial No. 70,085.

This invention relates to alternating current electric arc cutting, repairing and welding apparatus and more particularly to transformers for such apparatus.

The invention has for one of its objects to improve and simplify the general construction of transformers of this character and to provide one that shall be so wound and constructed as to obviate the necessity of the use of fans or other mechanical cooling means and the use of flux diverters, damping devices or manually operated resistances and reactances for regulating the current and potential in the primary and secondary windings.

A further object of the invention is the provision of a transformer of the character stated which may be connected to a single or polyphase power circuit.

With the foregoing and other objects in view, the invention consists of the novel construction, combination and arrangement of parts hereinafter fully described and claimed, and illustrated in the accompanying drawing, wherein:

Figure 1 is a diagrammatic view of an alternating current electric arc cutting, repairing and welding apparatus embodying a transformer constructed in accordance with my invention, Figure 2 is a similar view illustrating a slightly modified form of the transformer, and Figure 3 is a similar view illustrating a further modified form of the transformer.

Corresponding and like parts are referred to in the following description, and designated in all the figures of the drawing, by similar reference characters.

Referring in detail to the drawing, and more particularly to Figure 1, 1 designates a core which is of laminated construction and embodies a top leg 2, bottom leg 3, and side legs 4.

The primary winding of the transformer comprises coils 5 and 6 which are connected in series and of which the former is mounted on the leg 3 and the latter on the legs 4. The coils 6 are provided with leads 7 through the medium of which the primary winding may be connected to a single phase power circuit. The coil 5 is provided with a tap lead 8 through the medium of which and the leads 7 the primary winding may be connected to a polyphase power circuit.

The secondary winding of the transformer comprises main or voltage regulating coils 9 mounted on the legs 4 and an auxiliary or current regulating coil 10 mounted on the leg 2. The coils 9 are connected in parallel by wires 9ª and 9ᵇ, and these coils are connected in series with the coil 10 by a wire 9ᶜ. These coils are to be connected in this manner whenever the transformer is to be connected to a single phase power circuit. When it is to be connected to a polyphase power circuit, the coils 9 are connected in series by a wire 9ᵈ and in series with the coil 10 by a wire 9ᵉ as shown in Figure 2. In the apparatus shown in Figure 1, the main or voltage regulating coils 9 are connected by a lead 11 to the work 12 which is to be cut, repaired or welded, and the auxiliary or current regulating coil 10 is provided with taps 13 any one of which is adapted to be connected by a lead 14 to the cutting, repairing or welding electrode 15.

In the apparatus shown in Figure 2, one of the main or voltage regulating coils 9 is connected by a lead 11ª to the work 12. The auxiliary or current regulating coil 10 of this apparatus is provided with taps 13ª any one of which is adapted to be connected by a lead 14ª to the electrode 15.

The transformer embodied in the apparatus shown in Figure 3, differs slightly from the transformers embodied in the apparatus shown in Figures 1 and 2. The core and primary winding of this transformer are similar to the corresponding parts of the other transformers. Its secondary winding is however different, and as shown embodies three main or voltage regulating coils 16, 16ª and 16ᵇ and an auxiliary or current regulating coil 17 all connected in series. The coil 16 is mounted on the leg 3, the coils 16ª and 16ᵇ on the legs 4, and the coil 17 on the leg 2. The coil 16ª is connected by a lead 11ᵇ to the work 12, and the coil 17 is provided with taps 17ª any one of which is adapted to be connected by a lead 14ᵇ to the electrode 15.

In each transformer, current flowing through the primary winding tends to cause a magnetic flux to circulate through the four legs of the core. Practically all the flux developed by this winding will thread the main or voltage regulating coils of the secondary winding, because of the close association of such coils to the primary winding, and flux in the legs 3 and 4 about which these coils and the primary winding is distributed, remains substantially constant at all loads. As a result, the voltage generated in the main or voltage regulating coils of the secondary winding likewise remains practically the same at all times, and does not vary with the load.

The auxiliary or current regulating coil of the secondary winding, however, being remote from the primary winding, tends to set up a flux independent of and opposed to that generated by the primary winding. Owing to the location of the coils of both of the windings, this secondary flux is confined substantially to the leg 2 on which the auxiliary or current regulating coil of the secondary winding, is mounted, while the primary flux alone threads the legs 3 and 4, and, as a result, a substantial amount of flux is forced out of the closed metallic core into the air, or, in other words, a very noticeable flux leakage takes place at these points. The larger the current drawn from the secondary winding, the greater the flux leakage becomes.

As a result of such flux leakage, the heavy secondary flux causes the auxiliary or current regulating coil of the secondary winding to develop high inductance, and act as an impedance coil, so that the phase of the voltage in this part of the secondary winding is shifted. It will thus be understood that, when current flows through the primary winding, a constant main voltage and a variable secondary voltage is induced in the secondary winding. The reaction between these voltages is such that there is induced, in the secondary circuit, including the work and electrode, a light current at light load and a heavy current at heavy load, with the result that a stable arc of high power factor may be readily maintained during overhead, vertical and horizontal cutting, welding or repairing of steel, wrought iron, cast iron, malleable iron, aluminum, brass, bronze, copper and other alloy metals. Furthermore, the arc is free from sputtering and spitting, and it has been found that a skilled operator can maintain an arc within one and one-half per cent plus or minus of the rated capacity of the tap with which the electrode is connected.

What is claimed is:—

1. A transformer comprising a rectangular core, a primary winding distributed around three adjacent legs only of the core, and a secondary winding distributed around all the legs of the core.

2. A transformer comprising a rectangular core, a primary winding distributed around three legs only of the core, and a secondary winding embodying voltage regulating coils distributed around two of said legs and a current regulating coil distributed around the fourth leg of the core.

3. A transformer comprising a rectangular core, a primary winding distributed around three legs only of the core, and a secondary winding embodying voltage regulating coils distributed around two of said legs and a current regulating coil distributed around the fourth leg of the core, the voltage regulating coils being connected in parallel and connected in series with the current regulating coil.

4. A transformer comprising a rectangular core, a primary winding distributed around three legs only of the core, and a secondary winding embodying a current regulating coil distributed about the fourth leg of the core and a plurality of voltage regulating coils closely associated with the primary winding.

In testimony whereof I affix my signature.

FREDERICK C. OWEN.